United States Patent
Olds

(10) Patent No.: US 10,457,363 B1
(45) Date of Patent: Oct. 29, 2019

(54) ILLUMINATED LIFESAVING JACKET

(71) Applicant: Rodney A. Olds, Seale, AL (US)

(72) Inventor: Rodney A. Olds, Seale, AL (US)

( * ) Notice: Subject to any disclaimer, the term of this patent is extended or adjusted under 35 U.S.C. 154(b) by 0 days.

(21) Appl. No.: 15/967,644

(22) Filed: May 1, 2018

(51) Int. Cl.
| | |
|---|---|
| *B63C 9/20* | (2006.01) |
| *B63C 9/08* | (2006.01) |
| *H04W 76/10* | (2018.01) |
| *G01S 19/17* | (2010.01) |
| *B63C 9/11* | (2006.01) |
| *B63C 9/00* | (2006.01) |

(52) U.S. Cl.
CPC .............. *B63C 9/20* (2013.01); *B63C 9/08* (2013.01); *B63C 9/11* (2013.01); *G01S 19/17* (2013.01); *H04W 76/10* (2018.02); *B63C 2009/0017* (2013.01)

(58) Field of Classification Search
CPC ................ B63C 9/00; B63C 9/08; B63C 9/20
USPC .......................................... 441/80, 88, 89, 98
See application file for complete search history.

(56) References Cited

U.S. PATENT DOCUMENTS

| | | | |
|---|---|---|---|
| 4,527,504 A | 7/1985 | Byerley | |
| 5,370,566 A | 12/1994 | Mitchell, Jr. | |
| 5,603,648 A * | 2/1997 | Kea | B63C 9/1255 |
| | | | 441/89 |
| D501,906 S | 2/2005 | Woods | |
| 6,922,149 B1 | 7/2005 | Ford | |
| 7,714,730 B2 * | 5/2010 | Ford | B63C 9/20 |
| | | | 340/573.6 |
| 10,259,547 B1 * | 4/2019 | Kiel | B63C 9/20 |
| 2008/0258968 A1 | 10/2008 | Kim | |
| 2010/0300436 A1 | 12/2010 | McKeown | |
| 2012/0122358 A1 * | 5/2012 | Hansbro | B63C 9/20 |
| | | | 441/89 |
| 2012/0300435 A1 | 11/2012 | Hill | |
| 2014/0061273 A1 * | 3/2014 | Bullivant | A45F 3/04 |
| | | | 224/576 |

FOREIGN PATENT DOCUMENTS

EP 2527243 8/2017

* cited by examiner

Primary Examiner — Lars A Olson

(57) ABSTRACT

The illuminated lifesaving jacket is a personal floatation device compromising LED lighting, a cell phone pocket, a control unit, locator module, and a jacket battery pack. The LED lighting may increase the visibility of the jacket and may be activated by the control unit based upon input from a manual switch, a water-activated switch, or an application program running on a personal communication device such as a smart phone. The personal communication device may be held in the waterproof cell phone pocket and may wirelessly link to the control unit. The control unit may acquire location information from the locator module and may transmit messages that include location information to authorities in an effort to seek help. The jacket battery pack may provide electrical energy for the control unit, locator module, and personal communication device. A wristband may provide additional LED lighting to enhance visibility.

15 Claims, 3 Drawing Sheets

ILLUMINATED LIFESAVING JACKET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal floatation devices, more specifically, an illuminated lifesaving jacket.

SUMMARY OF INVENTION

The illuminated lifesaving jacket is a personal floatation device compromising LED lighting, a cell phone pocket, a control unit, locator module, and a jacket battery pack. The LED lighting may increase the visibility of the jacket and may be activated by the control unit based upon input from a manual switch, a water-activated switch, or an application program running on a personal communication device such as a smart phone. The personal communication device may be held in the waterproof cell phone pocket and may wirelessly link to the control unit. The control unit may acquire location information from the locator module and may transmit messages that include location information to authorities in an effort to seek help. The jacket battery pack may provide electrical energy for the control unit, locator module, and personal communication device. A wristband may provide additional LED lighting to enhance visibility.

An object of the invention is to provide a personal floatation device with LED lighting on the shoulders and neck area.

Another object of the invention is to provide lighting that may be activated by a control unit base upon input from a manual switch, a water-activated switch, or an application program running on a personal communication device.

A further object of the invention is to provide a locator module to provide location information to the control unit.

Yet another object of the invention is to provide a wristband that is wirelessly coupled to the control unit of the personal floatation device and provides additional lighting that may be activated by the control unit.

These together with additional objects, features and advantages of the illuminated lifesaving jacket will be readily apparent to those of ordinary skill in the art upon reading the following detailed description of the presently preferred, but nonetheless illustrative, embodiments when taken in conjunction with the accompanying drawings.

In this respect, before explaining the current embodiments of the illuminated lifesaving jacket in detail, it is to be understood that the illuminated lifesaving jacket is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the illuminated lifesaving jacket.

It is therefore important that the claims be regarded as including such equivalent construction insofar as they do not depart from the spirit and scope of the illuminated lifesaving jacket. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
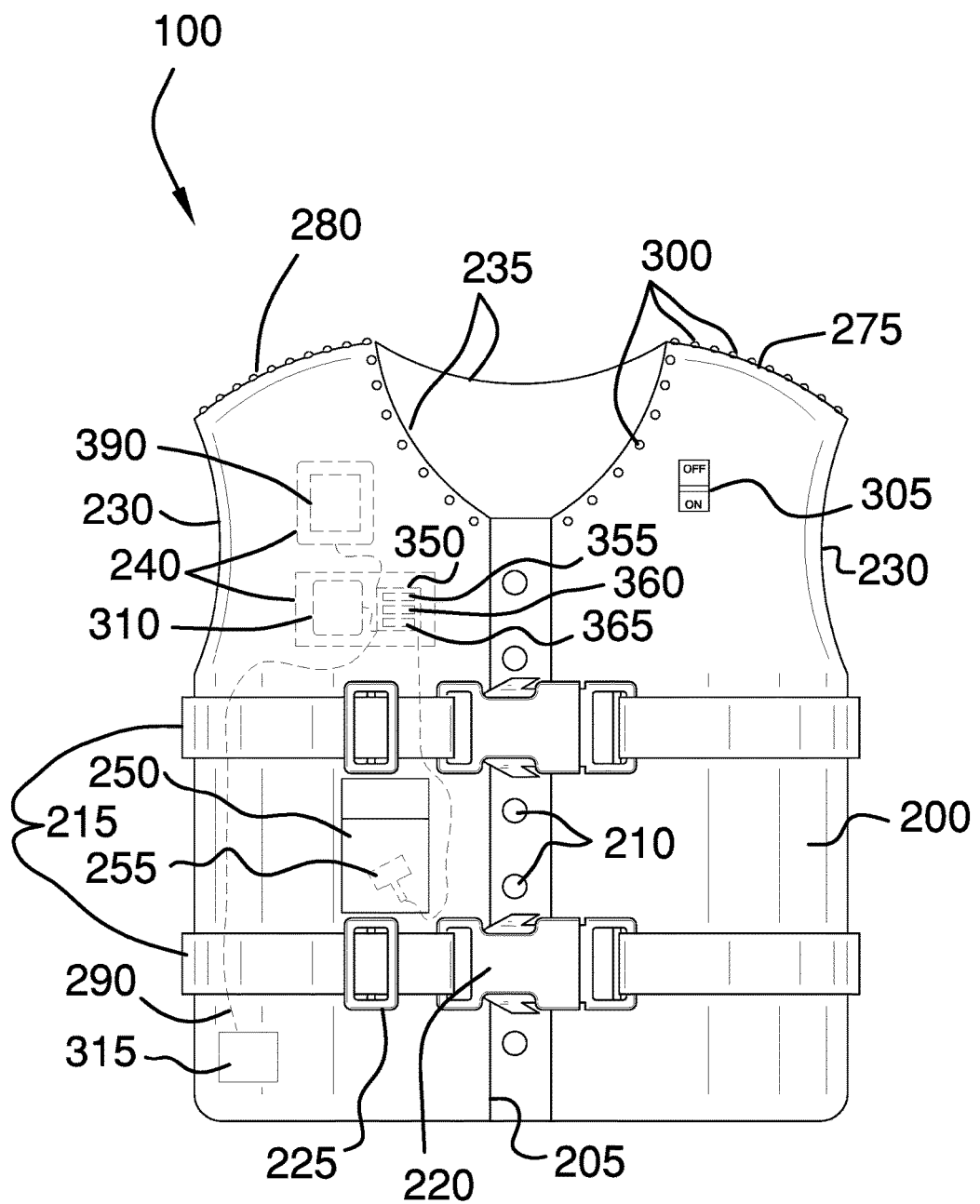
FIG. 1 is a front view of an embodiment of the disclosure.
Figure 2:
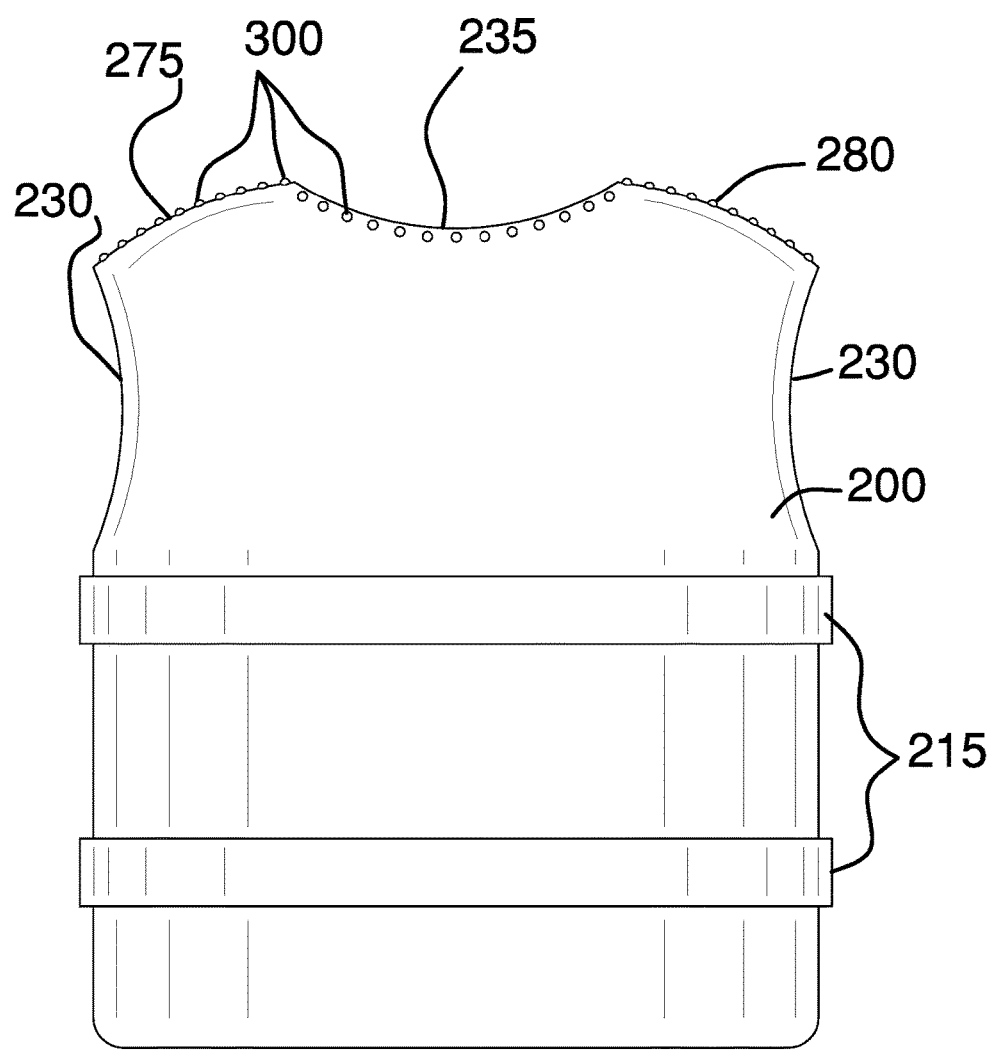
FIG. 2 is a rear view of an embodiment of the disclosure.
Figure 3:
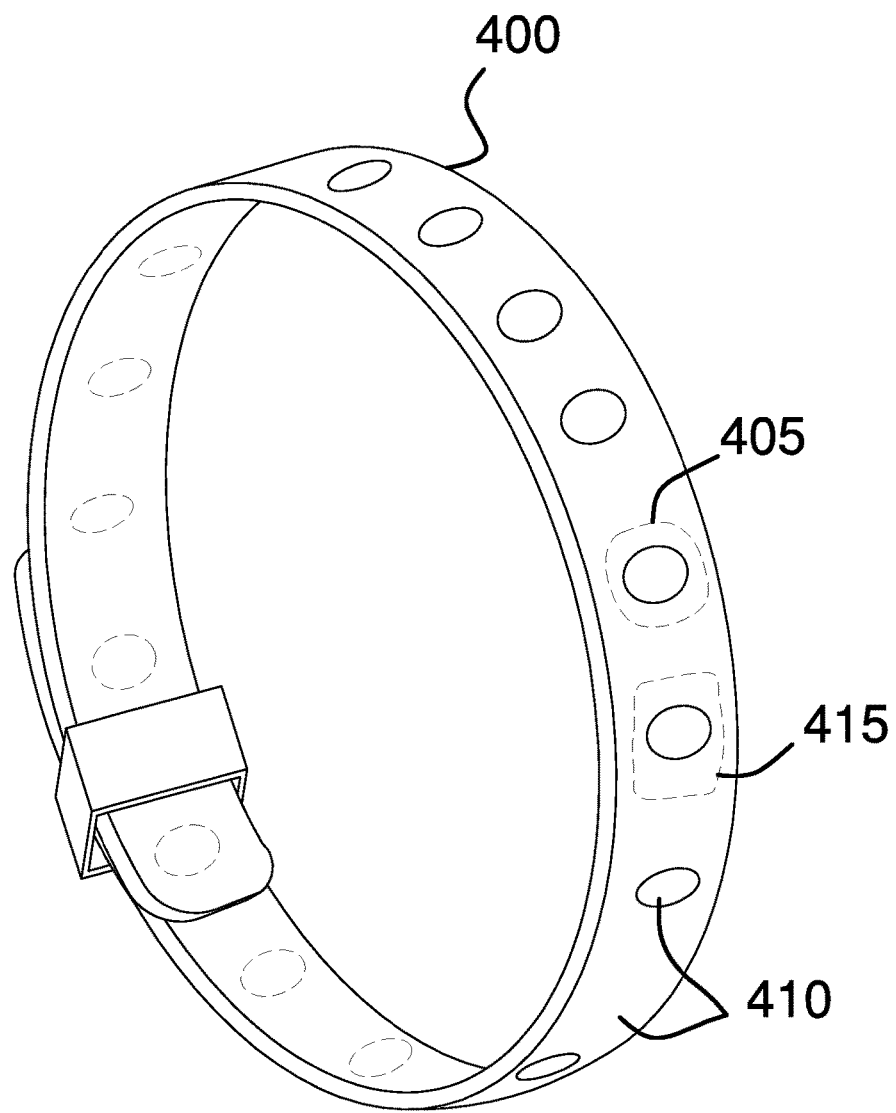
FIG. 3 is a detail view of an embodiment of the disclosure illustrating the wristband.

Detailed reference will now be made to a first potential embodiment of the disclosure, which is illustrated in FIGS. 1 through 3.

The illuminated lifesaving jacket 100 (hereinafter invention) comprises a life jacket 200, a plurality of jacket LEDs 300, a control unit 350, a locator module 310, a water-activated switch 315, and a jacket battery pack 390. The invention 100 is a personal floatation device with emergency illumination that is activated by exposure to water. The invention 100 may acquire location information from the locator module 310 and may notify authorities of the location information using a personal communication device (not illustrated in the figures).

The life jacket 200 may be a buoyant garment adapted to be worn over the torso and to keep a person floating on the surface of a body of water. The life jacket 200 may comprise an outer layer of material over a buoyant core. As a non-limiting example, the life jacket 200 may comprise a nylon covering over a foam core. The life jacket 200 may comprise a pair of arm openings 230 and a neckline 235. The pair of arm openings 230 may be adapted to fit over the arms of the person. The neckline 235 may be adapted to surround the neck of the person. The life jacket 200 may open for donning and removal along a breakline 205 running vertically down the front of the life jacket 200. A plurality of fasteners 210 may couple the opposing edges of the breakline 205 to hold the life jacket 200 in place. As non-limiting examples, the plurality of fasteners 210 may be clasps or snaps. The life jacket 200 may be secured by one or more adjustment straps 215 that surround the life jacket 200 horizontally. The ends of each of the one or more adjustment straps 215 may be joined to each other by one or more buckles 220 and the length of the one or more adjustment straps 215 may be adjusted using a plurality of strap length adjusters 225. As a non-limiting example, the plurality of strap length adjusters 225 may be tri-glides.

The life jacket 200 may comprise one or more waterproof compartments 240 which may enclose electrical components. The one or more waterproof compartments 240 may be sealed or may be accessible via a resealable aperture. As non-limiting examples, the one or more waterproof compartments 240 may enclose the plurality of jacket LEDs 300, the control unit 350, the locator module 310, an on/off control 305, the jacket battery pack 390, or combinations thereof.

The life jacket 200 may comprise a cell phone pocket 250. The cell phone pocket 250 may be a pouch for holding the personal communication device. The cell phone pocket 250 may be one of the one or more waterproof compartments 240. The personal communication device may be placed into the cell phone pocket 250 before entering the water so that even a non-waterproof phone may be kept dry and may operate from within the cell phone pocket 250. In some embodiments, a power connector 255 within the cell phone pocket 250 may couple the jacket battery pack 390 to the personal communication device via wiring 290 and may thereby extend the battery life of the personal communication device.

The plurality of jacket LEDs 300 may improve visibility of the life jacket 200 when the plurality of jacket LEDs 300 are illuminated. The plurality of jacket LEDs 300 may be disposed on upper areas of the life jacket 200 such that the visibility of the life jacket 200 is increased. As non-limiting examples, the plurality of jacket LEDs 300 may be coupled to the life jacket 200 surrounding the neckline 235, along a right shoulder line 280, along a left shoulder line 275, or combinations thereof. The plurality of jacket LEDs 300 may be powered using electrical energy obtained from the jacket battery pack 390. The plurality of jacket LEDs 300 may be waterproofed, either by placement of the plurality of jacket LEDs 300 in one of the one or more waterproof compartments 240 with transparent windows or by encapsulation of the plurality of jacket LEDs 300, either partially or wholly, in a waterproof compound.

The on/off state of the plurality of jacket LEDs 300 may be controlled by the control unit 350. The control unit 350 may change the on/off state of the plurality of jacket LEDs 300 based upon inputs to the control unit 350 from the water-activated switch 315, the on/off control 305, or by commands sent to the control unit 350 from an application software on the personal communication device. In some embodiments, the plurality of jacket LEDs 300 may blink when illuminated to make the life jacket 200 more conspicuous.

The control unit 350 may comprise a processor 355 and a memory 360 wherein the memory 360 contains instructions for causing the processor 355 to control the sequence and timing of the operations performed by the control unit 350. As non-limiting examples, the control unit 350 may monitor inputs such as the on/off control 305 and the water-activated switch 315, may control the operational state of the plurality of jacket LEDs 300, may acquire information from the locator module 310, and may establish a communication link with authorities via the personal communication device. As non-limiting examples, the control unit 350 may respond to an input from the water-activated switch 315 by activating the plurality of jacket LEDs 300, may determine the location information from the locator module 310 and may broadcast the location information to authorities via the personal communication device, and may activate the plurality of jacket LEDs 300 based upon input received from the application software running on the personal communication device.

The control unit 350 may comprise a wireless communication subsystem 365. The wireless communication subsystem 365 may wirelessly couple the control unit 350 and the personal communication device via a wireless communication channel. As a non-limiting example, the wireless communication channel may be a Bluetooth® link.

The locator module 310 may determine the location information based upon wireless signals that the locator module 310 receives from external sources. As a non-limiting example, the locator module 310 may be a Global Positioning System (GPS). The Global Positioning System may determine the location information based upon an analysis of the timing of wireless signals that it receives from a constellation of satellites circling Earth.

The water-activated switch 315 may be an electrical switch that completes an electrical circuit when exposed to water. The water-activated switch 315 may be mounted on the life jacket 200 in a position where it will be exposed to water if the life jacket 200 enters the water.

The jacket battery pack 390 may comprise one or more energy-storage devices. The jacket battery pack 390 may be a source of electrical energy to operate the plurality of jacket LEDs 300, the control unit 350, and the locator module 310. The jacket battery pack 390 may be replaceable or rechargeable. The jacket battery pack 390 may be enclosed in one of the one or more waterproof compartments 240.

The on/off control 305 may be an electrical switch that opens or closes an electrical circuit when the on/off control 305 is toggled. The on/off control 305 may be waterproof or may be positioned within one of the one or more waterproof compartments 240 such that the on/off control 305 may be toggled from outside of the one or more waterproof compartments 240. The on/off control 305 may be electrically coupled to the control unit 350 via the wiring 290.

The invention 100 may further comprise a wristband 400. The wristband 400 may comprise a wristband battery 405, a plurality of wristband LEDs 410 and a wristband wireless interface 415. The plurality of wristband LEDs 410 may be disposed over the surface of the wristband 400 so that when the plurality of wristband LEDs 410 are illuminated the visibility of the wristband 400 is increased. The wristband wireless interface 415 may wirelessly couple the wristband 400 with the wireless communication subsystem 365 of the control unit 350 via the wireless communication channel such that the control unit 350 may control the on/off state of the plurality of wristband LEDs 410. As a non-limiting example, the wristband wireless interface 415 may be a Bluetooth® link. The plurality of wristband LEDs 410 may illuminate when activated by the control unit 350 via messages send via the wristband wireless interface 415. In some embodiments, the plurality of wristband LEDs 410 may be turned on or off using one or more manual controls present on the wristband 400.

In use, the person dons the life jacket 200 when near water, such as when boarding a boat. If the person senses trouble developing, the person may place the personal communication device in the cell phone pocket 250 to protect it and to use it for communicating. If time permits, the person may activate the plurality of jacket LEDs 300 and begin the communication process using the application software on the personal communication device.

Alternatively, the plurality of jacket LEDs 300 may be illuminated and the communication process may begin when the person enters water and the water-activated switch 315 alerts the control unit 350 or when the person activates the on/off control 305 manually. The communication process may involve the control unit 350 acquiring the location information from the locator module 310 and notifying authorities using the personal communication device. As a non-limiting example, the control unit 350 may send a text message to 911 via the personal communication device. The text message may contain the latitude and longitude from the location information and a brief description of a water emergency If the wristband 400 is being worn when the life jacket 200 enters the water, the water-activated switch 315 may trigger the control unit 350 to send one or more messages to the wristband 400 via the wireless communication subsystem 365 and the wristband wireless interface 415. The messages may cause the wristband 400 to illuminate the plurality of wristband LEDs 410. The person may wave a hand in the air, thus lifting the wristband 400 higher and increasing their visibility.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, an "application" or "app" is software that is specifically designed for use with a personal computing device.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, "Bluetooth" is a standardized communication protocol that is used to wirelessly interconnect electronic devices. Bluetooth® is a registered trademark of Bluetooth SIG.

As used in this disclosure, a "channel" is a tubular passage through which an object or fluid is passed through.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used herein, the words "data" and "information" are used interchangeably to refer to raw, unprocessed facts and to facts that have been processed, structured, organized, or presented in a context that makes the facts useful.

As used herein, "front" indicates the side of an object that is closest to a forward direction of travel under normal use of the object or the side or part of an object that normally presents itself to view or that is normally used first. "Rear" or "back" refers to the side that is opposite the front.

As used herein, "GPS" refers to a device that uses signals received from a system of navigational satellites to determine the position of the device. GPS is an acronym for Global Positioning System.

As used in this disclosure, an "interface" is a physical or virtual boundary that separates two different systems and across which information is exchanged.

As used in this disclosure, a "pocket" is a pouch or storage space that is formed into an object. Pockets are often formed by joining a second textile or a second sheeting to a first textile or a first sheeting, respectively, by sewing or heat sealing respectively.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure a "strap" is a strip of leather, cloth, nylon, plastic, thin metal, or other flexible material, often with a buckle, that is used to fasten, secure, carry, or hold onto something.

As used in this disclosure, a "switch" is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch, respectively. Completing or interrupting an electric circuit is also referred to as making or breaking the circuit, respectively.

As used in this disclosure, "transparent" refers to a material that allows light to pass through the material without significant scattering such that an object can be clearly seen through the material.

As used herein, the word "waterproof" refers to an object that is not harmed when being exposed to water, including total submersion for a period of time. When used as a verb, "waterproof" refers to taking steps to make an object waterproof. Non-limiting examples of such steps may include applying special coatings or using gaskets to seal seams and entry points of an enclosure.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A illuminated lifesaving jacket comprising:
a life jacket, a plurality of jacket LEDs, a control unit, a locator module, a water-activated switch, and a jacket battery pack;
wherein the illuminated lifesaving jacket is a personal floatation device with emergency illumination that is activated by exposure to water;
wherein the illuminated lifesaving jacket acquires location information from the locator module and notifies authorities of the location information using a personal communication device;
wherein the life jacket comprises an outer layer of material over a buoyant core;
wherein the life jacket comprises a pair of arm openings and a neckline;
wherein the pair of arm openings is adapted to fit over arms of a person;
wherein the neckline is adapted to surround the neck of the person;
wherein the life jacket opens for donning and removal along a breakline running vertically down the front of the life jacket;
wherein a plurality of fasteners couple the opposing edges of the breakline to hold the life jacket in place;
wherein the life jacket is secured by one or more adjustment straps that surround the life jacket horizontally;
wherein the ends of each of the one or more adjustment straps are joined to each other by one or more buckles and the length of the one or more adjustment straps are adjusted using a plurality of strap length adjusters;
wherein the life jacket comprises one or more waterproof compartments which encloses electrical components;
wherein the one or more waterproof compartments are sealed or are accessible via a resealable aperture;
wherein the life jacket comprises a cell phone pocket;
wherein the cell phone pocket is a pouch for holding the personal communication device;
wherein the cell phone pocket is one of the one or more waterproof compartments;
wherein the personal communication device is placed into the cell phone pocket before entering the water so that the personal communication device is kept dry and operates from within the cell phone pocket;
wherein a power connector within the cell phone pocket couples the jacket battery pack to the personal communication device via wiring and thereby extends the battery life of the personal communication device.

2. The illuminated lifesaving jacket according to claim 1 wherein the plurality of jacket LEDs improve visibility of the life jacket when the plurality of jacket LEDs are illuminated;
wherein the plurality of jacket LEDs are disposed on upper areas of the life jacket such that the visibility of the life jacket is increased.

3. The illuminated lifesaving jacket according to claim 2 wherein the plurality of jacket LEDs are coupled to the life jacket surrounding the neckline, along a right shoulder line, along a left shoulder line, or combinations thereof;
wherein the plurality of jacket LEDs are powered using electrical energy obtained from the jacket battery pack;
wherein the plurality of jacket LEDs are waterproofed, either by placement of the plurality of jacket LEDs in one of the one or more waterproof compartments with transparent windows or by encapsulation of the plurality of jacket LEDs, partially or wholly, in a waterproof compound;
wherein the on/off state of the plurality of jacket LEDs is controlled by the control unit;
wherein the control unit changes the on/off state of the plurality of jacket LEDs based upon inputs to the control unit from the water-activated switch, an on/off control, or by commands sent to the control unit from an application software on the personal communication device.

4. The illuminated lifesaving jacket according to claim 3 wherein the plurality of jacket LEDs blink when illuminated to make the life jacket more conspicuous.

5. The illuminated lifesaving jacket according to claim 3 wherein the control unit comprises a processor and a memory wherein the memory contains instructions for causing the processor to control the sequence and timing of the operations performed by the control unit.

6. The illuminated lifesaving jacket according to claim 5 wherein the control unit monitors inputs, controls the operational state of the plurality of jacket LEDs, acquires information from the locator module, and establishes a communication link with authorities via the personal communication device.

7. The illuminated lifesaving jacket according to claim 5 wherein the control unit comprises a wireless communication subsystem;
wherein the wireless communication subsystem wirelessly couples the control unit and the personal communication device via a wireless communication channel.

8. The illuminated lifesaving jacket according to claim 7 wherein the locator module determines the location information based upon wireless signals that the locator module receives from external sources.

9. The illuminated lifesaving jacket according to claim 8 wherein the locator module is a Global Positioning System.

10. The illuminated lifesaving jacket according to claim 8
wherein the water-activated switch is an electrical switch that completes an electrical circuit when exposed to water;
wherein the water-activated switch is mounted on the life jacket in a position where it is exposed to water if the life jacket enters the water.

11. The illuminated lifesaving jacket according to claim 10
wherein the jacket battery pack comprises one or more energy-storage devices;
wherein the jacket battery pack is a source of electrical energy to operate the plurality of jacket LEDs, the control unit, and the locator module;
wherein the jacket battery pack is replaceable or rechargeable;
wherein the jacket battery pack is enclosed in one of the one or more waterproof compartments.

12. The illuminated lifesaving jacket according to claim 11
wherein the on/off control is an electrical switch that opens or closes an electrical circuit when the on/off control is toggled;
wherein the on/off control is waterproof or is positioned within one of the one or more waterproof compartments such that the on/off control is toggled from outside of the one or more waterproof compartments;
wherein the on/off control is electrically coupled to the control unit via the wiring.

13. The illuminated lifesaving jacket according to claim 12
wherein the illuminated lifesaving jacket comprises a wristband;
wherein the wristband comprises a wristband battery, a plurality of wristband LEDs and a wristband wireless interface;
wherein the plurality of wristband LEDs are disposed over the surface of the wristband so that when the plurality of wristband LEDs are illuminated the visibility of the wristband is increased;
wherein the wristband wireless interface wirelessly couples the wristband with the wireless communication subsystem of the control unit via the wireless communication channel such that the control unit controls the on/off state of the plurality of wristband LEDs.

14. The illuminated lifesaving jacket according to claim 13
wherein the plurality of wristband LEDs illuminate when activated by the control unit via messages send via the wristband wireless interface.

15. The illuminated lifesaving jacket according to claim 14 wherein the plurality of wristband LEDs are turned on or off using one or more manual controls present on the wristband.

\* \* \* \* \*